United States Patent [19]
Akkara

[11] Patent Number: 6,150,491
[45] Date of Patent: *Nov. 21, 2000

[54] POLYAROMATIC COMPOUNDS AND METHOD FOR THEIR PRODUCTION

[75] Inventor: Joseph A Akkara, Holliston, Mass.

[73] Assignee: The United States of America as represented by the Secretary of the Army, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 09/187,209

[22] Filed: Nov. 6, 1998

[51] Int. Cl.$^7$ ............................ C08G 65/38; C08G 65/40
[52] U.S. Cl. .............................. 528/86; 528/99; 528/104; 528/167; 528/170; 528/212; 528/214; 528/480; 525/566; 435/456
[58] Field of Search ............................. 528/86, 99, 104, 528/167, 170, 212, 214, 480; 435/156; 525/506

[56] References Cited

U.S. PATENT DOCUMENTS 4,900,671  2/1990  Pokora et al. ........................... 435/156

*Primary Examiner*—Duc Truong

[57] ABSTRACT

Polyaromatic compound made by polymerizing one or more aromatic monomers, at least one of the one or more aromatic monomers having the following structure:

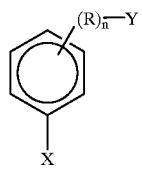

(I)

wherein X is selected from the group consisting of OH and $NH_2$, Y is selected from the group consisting of a halogen, a halogen-containing group, a boron-containing group, a phosphorus-containing group, a carboxyl group, a hydroxyacid group, a carboxyacid group, an amino group, an amino acid group, an amide group, an ester group, a hydroxyl group and a sulfonic acid group, R is an alkyl, phenyl, naphthyl, hydroxyphenyl, hydroxy naphthyl or hydroxy ($\alpha$, $\beta$, $\gamma$) alkyl group, and n is an integer from 0 to 12. The $(R)_n$—Y group is preferably either ortho or para to X and more preferably is para to X. The polyaromatic compound may be a homopolymer consisting of one species of aromatic monomer of formula (I), a copolymer consisting of two or more species of aromatic monomers of formula (I), or a copolymer comprising one or more species of aromatic monomer of formula (I) and one or more species of an aromatic monomer not of formula (I). Preferably, the one or more aromatic monomers are reacted with a stoichiometric amount of hydrogen peroxide in the presence of horseradish peroxidase, the reaction taking place in water or in a mixture of water and one or more polar solvents. To obtain a substantial yield, the pH of the reaction medium is preferably around or below the $pK_a$ of the functional group of the monomer(s) being polymerized.

20 Claims, 1 Drawing Sheet

POLYAROMATIC COMPOUNDS AND METHOD FOR THEIR PRODUCTION

STATEMENT REGARDING FEDERALLY SPONSORED RESEARCH AND DEVELOPMENT

The invention herein may be manufactured, used and licensed by or for the Government for Governmental purposes without the payment to us of any royalty thereon.

BACKGROUND OF THE INVENTION

The present invention relates generally to polyaromatic compounds and methods for their production and more particularly to the synthesis of polyaromatic compounds using biocatalysts.

Traditionally, phenolic resins, such as novolacs and resoles, have been commercially prepared by condensing phenol and formaldehyde at various desired molar ratios in the presence of a particular acid or base catalyst. However, due to the carcinogenic nature of formaldehyde, the use of formaldehyde in phenolic resin production poses a major threat to the health and safety of personnel involved therein. In addition to the aforementioned health and safety risks associated with the use of formaldehyde in phenolic resin production, residual amounts of formaldehyde are typically present in the finished product—a result that is both undesirable and largely unavoidable.

One alternative to using formaldehyde to prepare phenolic resins has been to use inorganic catalysts (e.g., copper halide+an aliphatic amine) or biocatalysts (e.g., peroxidase enzymes). In addition to avoiding the problems associated with the use of formaldehyde, phenolic polymers produced by enzymatic reactions typically have the additional advantage of having extensive backbone conjugation, thereby leading to conductivity under doped conditions. Other advantages of using enzymes to catalyze phenol polymerization include mild reaction conditions, fast reaction rates, high substrate specificity and minimal by-product formation. Horseradish peroxidase is the most commonly used enzyme for these polymerization reactions, which are typically carried out in solvent/water mixtures and microemulsions. Polymer molecular weight and polydispersity are controllable using the aforementioned enzymatic method.

One shortcoming that has been noted in connection with the aforementioned phenolic resins is that they have limited solubility in water. As a result, such resins are limited in their utility in certain applications, such as in use in rechargeable batteries, photolithography, fire retardants and detergents. For example, polypyrrole is the most widely used conjugated polymer in enzyme-mediated glucose detection. Polythiophene, polydiacetyline and polyaniline are a few other polymers used in this context. However, these polymers lack the flexibility to incorporate recognition sites into their backbone and/or an ease of synthesis and/or modification. Polypyrroles, for example, are usually obtained as water-insoluble films which are used to physically trap or to sandwich biomolecules in the preparation of biosensing elements. Incorporation by covalently linking the biomolecules to the polymer backbone requires the use of functionalized monomers with carboxyl or amine groups. Such functionalized thiophene monomers have been used to develop a generic molecular assembly for pesticide sensor applications.

In U.S. Pat. No. 5,508,180, inventors Johnson et al., which issued Apr. 16, 1996, and which is incorporated herein by reference, there is disclosed a biocatalytic oxidative process for preparing phenolic resins using soybean peroxidase. According to said patent, phenols which are preferred for polymerization are represented by the following formula:

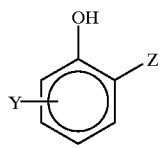

wherein Y and Z are selected from the group consisting of a hydrogen atom, a halogen atom, an alkyl group, an alkoxy group, an aryl group, an allyl group, a phenylalkyl group, a —COOR group, a —NR$^1$R$^2$, where R represents a hydrogen atom or a lower alkyl group, and R$^1$ and R$^2$ represent a hydrogen atom, an alkyl group, or a phenylalkyl group or Z in conjunction with the adjacent meta position forms a condensed benzene ring. Since polymerization proceeds via the ortho or para positions, when Y is at the ortho or para position, at least one of Y and Z must be a hydrogen atom or Z must form said condensed benzene ring. Y is preferably para to the phenolic hydroxyl group. Otherwise, the phenol adds as a terminal group as discussed below. At the para position, long chain alkyl groups have a tendency to slow the reaction. The reaction appears to proceed best when Y is p-phenyl, p-methoxy or p-halogen. A single phenol or a mixture of phenols may be used in the polymerization reaction. In certain applications, it may be desirable to produce phenolic resins having certain terminal groups.

In U.S. Pat. No. 5,420,237, inventors Zemel et al., which issued May 30, 1995, and which is incorporated herein by reference, there is disclosed a method for enzymatically synthesizing electrically conductive and substituted and unsubstituted polyanilines. According to said patent, aniline monomer(s), an oxidizing agent, which comprises an enzyme and an electron acceptor, and an acidifying agent are reacted together to form polyanilines. The patent identifies the following as illustrative of such aniline monomers:

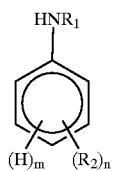

wherein n is an integer from 0 to 4; m is an integer from 1 to 5 with the proviso that the sum of n and m is equal to 5 and that at least one position on the aniline ring is a moiety which allows oxidative coupling at that position; R$_1$ is a hydrogen or a permissible R$_2$ substituent; and R$_2$ is the same or different at each occurrence and is selected from the group consisting of alkyl, alkenyl, alkoxy, cycloaklyl, cycloalkenyl, alkanoyl, alkylthio, aryloxy, alkylthioalkyl, alkylaryl, arylalkyl, amino, alkylamino, dialkylamino, aryl, alkylsulfinyl, aryloxyalkyl, alkylsulfinylalkyl, alkoxyalkyl, alkylsulfonyl, aryl, arylthio, alkylsulfonyl, carboxylic acid, hydroxy, halogen, cyano, sulfonic acid, nitro, mercapto, alkylsilane or alkyl substituted with one or more sulfonic acid, carboxylic acid, halo, nitro, mercapto, cyano, or epoxy moieties; or any two R$_2$ groups together may form an alkylene or alkenylene chain completing a 3, 4, 5, 6 or 7 membered aromatic or alicyclic ring, which ring may optionally include one or more divalent nitrogen, sulfur, sulfonyl, ester, carbonyl, sulfonyl, or oxygen atoms, or $R_2$ is an aliphatic moiety having repeat units of the formula:

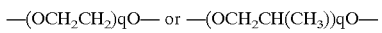

in which q is a positive whole number. A moiety which allows oxidative coupling is any moiety that does not hinder the head-to-tail coupling of the monomers in forming polyaniline. An example of such a moiety is hydrogen or deuterium.

In Ayyagari and Akkara, "Enzymatic synthesis of multifunctional polyphenols for biosensor applications," *Polymeric Materials Science & Engineering*, 76:610–611 (1997), which is incorporated herein by reference, there is disclosed the copolymerization of p-ethylphenol (EP) and 3-(4-hydroxyphenyl)propionic acid (HPPA) at different molar ratios. According to the publication, the copolymerization reaction involves dissolving the monomers in ethanol and adding HEPES buffer (1 mM, pH 7.5) to obtain a final ethanol content of about 25% (v/v). The final monomer concentration is 0.15M. An aliquot of enzyme solution, prepared by dissolving horseradish peroxidase (Type II) in N-[2-hydroxyethyl]piperazine-N'[2-ethanesulfonic acid] (HEPES) buffer at a known concentration, is added to the monomer solution such that the final enzyme concentration is 0.1 mg/ml. The reaction is initiated by dropwise addition of $H_2O_2$. The total amount of $H_2O_2$ added is 30% in excess of stoichiometric amount. The reactions are continued for 24 hours. At the end, solvent is evaporated under the flow of nitrogen at room temperature. The dry material is washed with isooctane and water separately to remove unreacted monomers, salts and the enzyme. The material is then dried at 40° C. under vacuum.

Additional patents of interest include the following, all of which are incorporated herein by reference: U.S. Pat. No. 5,639,806, inventors Johnson et al., issued Jun. 17, 1997; U.S. Pat. No. 5,606,010, inventors Erhan et al., issued Feb. 25, 1997; U.S. Pat. No. 5,367,043, inventors Butler et al., issued Nov. 22, 1994; U.S. Pat. No. 5,278,055, inventors Cyrus, Jr. et al., issued Jan. 11, 1994; U.S. Pat. No. 4,900,671, inventors Pokora et al., issued Feb. 13, 1990; U.S. Pat. No. 4,882,413, inventor Erhan, issued Nov. 21, 1989; and U.S. Pat. No. Re. 35,247, inventors Cyrus, Jr. et al., reissued May 21, 1996.

SUMMARY OF THE INVENTION

It is an object of the present invention to provide novel polyaromatic compounds and a method for their production.

According to one aspect of the present invention, there is disclosed a polyaromatic compound made by polymerizing one or more aromatic monomers, at least one of said one or more aromatic monomers having the following structure:

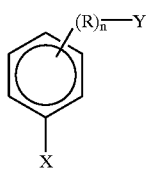

wherein X is selected from the group consisting of OH and $NH_2$, Y is selected from the group consisting of a halogen, a halogen-containing group, a boron-containing group, a phosphorus-containing group, a carboxyl group, a hydroxyacid group, a ketoacid group, an amino group, an amino acid group, an amide group, an ester group, a hydroxyl group and a sulfonic acid group, R is an alkyl, phenyl, naphthyl, hydroxyphenyl, hydroxy naphthyl or hydroxy ($\alpha, \beta, \gamma$) alkyl group, and n is an integer from 0 to 12. Preferably, the $(R)_n$—Y group is either ortho or para to X; more preferably the $(R)_n$—Y group is para to X.

One benefit associated with the polyaromatic compounds of the present invention is that said polyaromatic compounds can be prepared with a controlled functional group density and type of desired functional groups. For example, using a particular density of ionizable functional groups, the resultant polymer can be imbued with a desired solubility for a given solvent or mixtures of solvents. Accordingly, such a polymer may be well-suited for use in the fields of photoresists, rechargeable batteries and detergency. In a like manner, a polymer made containing halogen functional groups of a particular density (or number of functional groups per unit mole of polymer) should exhibit fire resistant properties. It is expected that such a polymer can also be blended with nylon 6 to enhance the fire retardant and fire resistant properties of the nylon.

Another benefit associated with the polyaromatic compounds of the present invention is that said polyaromatic compounds can be prepared so as to be amenable for derivatization (e.g., for attachment of a particular type of ligand thereto) based upon specific end-use applications.

Still another benefit associated with the polyaromatic compounds of the present invention is that said polyaromatic compounds can be generated on a large scale in either a batch mode or a continuous mode of operation, with high polymer yields (e.g., 95% yield); at the same time, monomer conversion and polymer molecular weight can also be controlled where desired.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

BRIEF DESCRIPTION OF THE DRAWING

The accompanying drawing, which is hereby incorporated into and constitutes a part of this specification, illustrates preferred embodiments of the invention and, together with the description, serves to explain the principles of the invention. In the drawing wherein like reference numerals represent like parts.

DETAILED DESCRIPTION OF PREFERRED EMBODIMENTS

Figure 1:
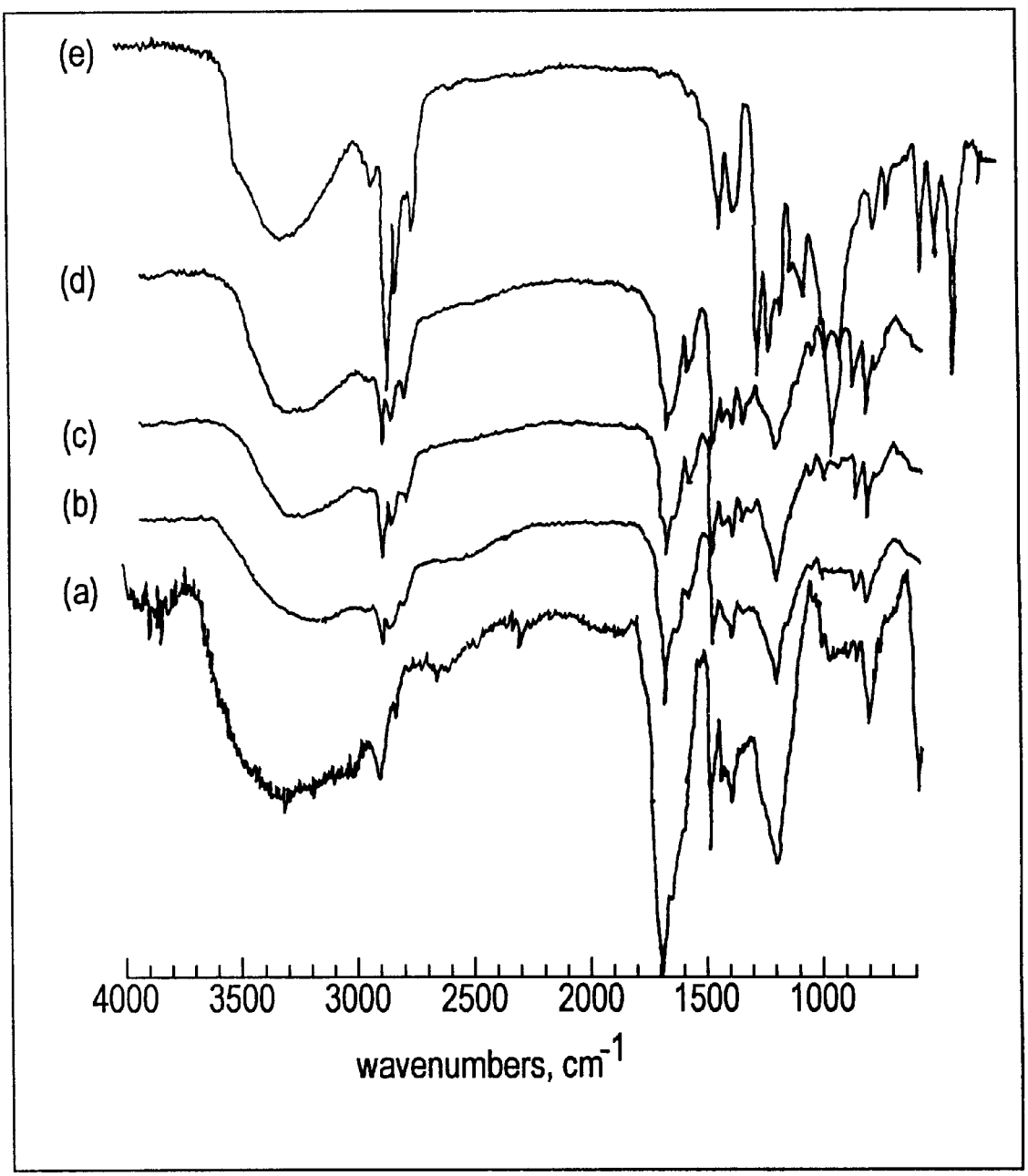
FIG. 1 is a graphic representation of the FT-IR spectra of copolymers of 4-ethylphenol and 3-(4-hydroxyphenyl) propionic acid prepared in accordance with the teachings of the present invention at respective ratios of (a) 0:1, (b) 1:1, (c) 4:1, (d) 8:1 and (e) 1:0.

As noted above, the present invention is directed to a class of polyaromatic compounds and to a method for their production. The polyaromatic compounds of the present invention are made by polymerizing one or more aromatic monomers, at least one of said one or more aromatic monomers having the following structure:

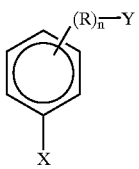

(I)

wherein X is selected from the group consisting of OH and $NH_2$, Y is selected from the group consisting of a halogen (e.g., bromine), a halogen-containing group, a boron-containing group, a phosphorus-containing group, a carboxyl group, a hydroxyacid group, a ketoacid group, an amino group, an amino acid group, an amide group, an ester group, a hydroxyl group and a sulfonic acid group, R is an alkyl, phenyl, naphthyl, hydroxyphenyl, hydroxy naphthyl or hydroxy ($\alpha$, $\beta$, $\gamma$) alkyl group, and n is an integer from 0 to 12. Preferably, the $(R)_n$—Y group is either ortho or para to X; more preferably the $(R)_n$—Y group is para to X.

Examples of aromatic monomers of formula (I) in which the $(R)_n$—Y group includes a carboxyl group are 4-hydroxybenzoic acid, 4-hydroxyphenyl acetic acid, 3-(4-hydroxyphenyl)propionic acid, 4-hydroxycinnamic acid and 4-(4-hydroxyphenyl)benzoic acid.

An example of an aromatic monomer of formula (I) in which the $(R)_n$—Y group includes a hydroxyacid group is 4-hydroxyphenyl lactic acid. An example of an aromatic monomer of formula (I) in which the $(R)_n$—Y group includes a ketoacid group is 4-hydroxyphenyl pyruvic acid.

Examples of aromatic monomers of formula (I) in which the $(R)_n$—Y group includes an amino group are 4-hydroxyphenyl methyl amine, 4-hydroxyphenyl ethyl amine and N-(4-hydroxyphenyl)glycine. Examples of aromatic monomers of formula (I) in which the $(R)_n$—Y group includes an amino acid group are 4-hydroxyphenylglycine and 4-hydroxyphenylalanine. Examples of aromatic monomers of formula (I) in which the $(R)_n$—Y group includes an amide group are 4-hydroxyphenylacetamide, sulfanilamide, 4-hydroxybenzamide and N-(4-hydroxyphenyl)stearamide.

Examples of aromatic monomers of formula (I) in which the $(R)_n$—Y group includes an ester group are tyrosine methyl ester, tyrosine ethyl ester, tyrosine propyl ester, methyl 4-hydroxybenzoate, methyl 4-hydroxyphenyl acetate, propyl 4-hydroxybenzoate and 3-(4-hydroxyphenyl) propionic acid N-hydroxysuccinimide ester. Examples of aromatic monomers of formula (I) in which the $(R)_n$—Y group includes an alcohol are 4-hydroxyphenylmethyl alcohol, 4-hydroxyphenylethyl alcohol, 4-hydroxyphenylpropyl alcohol, and bisphenol A. Examples of aromatic monomers of formula (I) in which the $(R)_n$—Y group includes a sulfonic acid group are 4-hydroxybenzene sulfonic acid, 4-hydroxyphenylethane sulfonic acid, 4-aminobenzene sulfonic acid, sulfanilamide and diaminobenzene sulfonic acid.

Examples of aromatic monomers of formula (I) in which the $(R)_n$—Y group includes a halogen are 2-bromophenol, 4-bromophenol, 4-chlorophenol, 4-hydroxyphenyl methyl bromide, 3,5-bis(trifluoromethyl)phenol and 4-hydroxyphenyl ethyl bromide.

The polymers of the present invention may be homopolymers consisting of one species of aromatic monomer of formula (I), copolymers consisting of two or more species of aromatic monomers of formula (I), or copolymers comprising one or more species of aromatic monomer of formula (I) and one or more species of an aromatic monomer not of formula (I), such as a p-alkylphenol (e.g., p-ethylphenol).

Preferably, the polyaromatic compounds of the present invention are prepared by reacting together said one or more aromatic monomers with hydrogen peroxide in the presence of horseradish peroxidase, the reaction taking place in water or in a mixture of water and another polar solvent (e.g., ethanol). The total amount of hydrogen peroxide added to the reaction mixture is preferably in excess of that of the monomer; however, to prevent denaturation of the horseradish peroxidase, the hydrogen peroxide is preferably added to the reaction mixture in small increments over an extended period of time (e.g., one-tenth of total amount added every thirty minutes).

Instead of using horseradish peroxidase to catalyze the polymerization reaction, other oxidases and peroxidases may be used, such as lignin-, *Coprinus cinerus*-, and soybean peroxidases and isoenzymes of horseradish and soybean peroxidases; tyrosinases; laccases; phenoloxidases; aromatic amineoxidases; and cytochrome oxidase. Moreover, catalysts other than peroxidases may be used, such as heme and heme-containing compounds, examples of which include hemoglobin, hematin, cytohemin, myoglobin and cytochromes (e.g., c, c1, c2, c3, c551, f, and P450).

In those instances in which the polymerization reaction is conducted under aerobic conditions and tyrosinase is used as the biocatalyst, hydrogen peroxide need not be added to the reaction mixture since tyrosinase will produce a sufficient amount of hydrogen peroxide from air for the polymerization reaction. Hydrogen peroxide can also be generated in situ and, therefore, need not be added to the reaction mixture (regardless of the particular biocatalyst used) by adding, under aerobic conditions, glucose oxidase and glucose to the reaction mixture.

It is to be understood that peroxides other than hydrogen peroxide, examples of which include perbenzoic acid and peracetic acid, may be used instead of hydrogen peroxide in the polymerization reaction.

The pH of the reaction mixture is preferably in the range of about 2–8, more preferably 3–7, even more preferably 3–5. Moreover, to obtain a substantial yield, the pH of the reaction medium should be around or below the $pK_a$ of the functional group of the monomer(s) being polymerized (i.e., a pH of approximately 3–4 as in 4-hydroxyphenyl propionic acid). One advantage to using some of the non-peroxidase biocatalysts identified above is that they are not as sensitive as are the peroxidases to being adversely affected by the low pH conditions necessary to polymerize monomers whose functional groups have low $pK_a$ values. Therefore, when using such non-peroxidase biocatalysts, even lower pH conditions than those specified above may be possible.

The experiments described below are intended merely to be illustrative of the principles of the present invention and are in no way intended to be limiting.

Materials and Methods

All reagents were obtained from Aldrich Chemical Company (Milwaukee, Wis.). Horseradish peroxidase (Type II) was supplied by Sigma Chemical Company (St. Louis, Mo.). Reaction mixtures were prepared by first dissolving the monomer in HEPES buffer (1 mM to 100 mM, pH 7.5) or a mixture of ethanol and buffer. Enzyme dissolved in buffer was added, and the reaction was initiated by adding hydrogen peroxide in small aliquots to a 30% stoichiometric excess. At the end of the reaction, polymers were precipitated by adding KCl, when necessary, and washed repeatedly with water and/or mixture of ethanol and water to remove monomer, salts and enzyme. The polymer was then dried under vacuum at not more than 50° C. Polymer yield was calculated as the weight ratio of the dry polymer product obtained finally to the weight of the monomer added at the beginning of the reaction. Polymer molecular weight was obtained on a Waters instrument (LC Module 1, Milford, Mass.) fitted with a gel permeation column (GBR mixed bed linear column, 100 to 20+million, Jordi Associates, Bellingham, Mass.). A UV detector calibrated at 270 nm was used with the instrument and the data was processed with Millenium 2010 Chromatography Manager software (Waters, Milford, Mass.). Polystyrene was used as a relative standard and N,N-dimethylformamide containing 1% LiBr was used as the eluent. The polymer samples were coated on Zn-Se slides to record infrared spectra on a Perkin-Elmer 1760 FTIR-FT Raman spectrophotometer (Norwalk, Conn.) at a 4 cm$^{-1}$ resolution.

Results and Discussion

The conventional reaction scheme for the synthesis of polyaromatic compounds using horseradish peroxidase (HRP) as a catalyst is as follows:

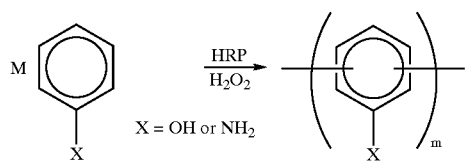

A detailed discussion of HRP-catalyzed reactions is available elsewhere (e.g., Ayyagari et al., Acta Polymerica, 47:193–203 (1996), which is incorporated herein by reference). Briefly, stoichiometric amount of hydrogen peroxide is necessary for the oxidative coupling among the monomer units and growing oligomers. Table I summarizes the results for reactions involving 4-hydroxybenzoic acid (4-HBA), 4-hydroxyphenyl acetic acid (4-HPAA) and 3-(4-hydroxyphenyl)propionic acid (4-HPPA), 4-hydroxybenzene sulfonic acid (HBSA), sulfanilinic acid (SAA) and 2,5-diaminobenzene sulfonic acid (2,5-DABSA).

TABLE I

| Monomer | pH adjusted by addition of HCl/NaOH | Buffer | Comments |
| --- | --- | --- | --- |
| 4-HPPA | (i) yes (pH adjusted from 4.3 to 7.5 with NaOH) (ii) no (pH 4.3) (iii) yes (pH adjusted from 4.3 to 3.0 with HCl) (iv) yes (pH adjusted from 4.3 to 7.4 with NaOH) (v) no (pH 3.3) (vi) no (2.4) | (i) 0.1M HEPES, pH 7.5 (ii) 0.1M HEPES, pH 7.5 (iii) 0.1M HEPES, pH 7.5 (iv) 0.01M HEPES, pH 7.5 (v) 0.01M HEPES, pH 7.5 (vi) no buffer | (i,ii) reaction mixture transparent and turned yellow; no polymer precipitate formed; identical results with 0% to 20% ethanol in the medium (iii) reaction mixture turned yellow and opaque; polymer yield was 70% (iv) reaction mixture transparent and turned reddish brown; no polymer precipitate (v) reaction mixture turned yellow & opaque; polymer yield 70% with 0% ethanol (100% buffer) and 85% with 20% ethanol (80% buffer) in the reaction medium (vi) reaction mixture turned yellow and opaque; polymer yield 50% medium |
| 4-HPAA | (i) yes (pH adjusted from 3.7 to 7.5 with NaOH) (ii) no (pH 3.1) (iii) no (pH 2.3) | (i) 0.1M HEPES, pH 7.5 (ii) 0.1M HEPES, pH 7.5 (iii) no buffer | (i) reaction mixture transparent and turned yellow; no polymer precipitate with 0% to 20% ethanol media (ii) reaction mixture turned yellow & opaque. Polymer precipitate formed after long time with about 15% yield in 20% ethanol (iii) reaction mixture turned yellow and slightly opaque; no polymer precipitate formed |
| 4-HBA | (i) yes (pH adjusted from 3.5 to 7.5 with NaOH) (ii) no (pH 3.0) | (i) 0.1M HEPES, pH 7.5 (ii) 0.01M HEPES, pH 7.5 | (i) reaction mixture dark brown instantly; no polymer precipitate formed (ii) reaction mixture turned brown and opaque; polymer precipitate formed after long time with about 10% yield in 20% ethanol |
| 4-HBSA | yes (pH adjusted from 0.4 to x with NaOH) x = 1–7 | 0.01M HEPES, pH 7.5 | reaction mixture turned dark brown at higher pH; very small amount of polymer precipitate at low pH values |
| SAA and 2,5-DABSA | no (pH 5.7) | 0.1M phosphate, pH 6.0 | reaction mixture turned dark with both monomers; reaction mixture with 2,5-DABSA was dialyzed against water, evaporated to dryness, precipitate extracted with methanol and molecular weight determination showed mostly monomers and dimers |

Clearly, only 4-HPPA was polymerizable with high yields while 4-HPAA and 4-HBA yielded much lower amounts of corresponding polymers under optimized conditions. Buffer strength and, consequently, pH of the monomer solution were found to have a profound effect on the polymerizability in these reactions. Although this observation may not be surprising from the viewpoint of pH effects on enzyme activity, it is interesting to note how the degree of ionization of the carboxy groups on the monomers affects their polymerizability. Table I summarizes the results from these experiments conducted in triplicate. Unless noted otherwise, all reactions were carried out either in 100% aqueous phase or in 20% ethanol/buffer mixtures. In general, reactions at any buffer concentration and at a pH>4 yielded little or no polymer product. For example, the pH of a 0.1 M solution of 4-HPPA in 0.1 M HEPES buffer (pH 7.5) was 4.3, which is close to the $pK_a$ (about 4.5) of the carboxy group in the monomer. Little or no polymer formation was observed in this system. On the other hand, the pH of a 0.1 M solution of the same monomer in 10 mM HEPES buffer (pH 7.5) was 3.2, and formation of poly(4-HPPA) was significant. Moreover, adjusting the pH of any solution to the optimal pH value (about 7) for the enzyme clearly was not useful for the reaction. Thus, polymerization of 4-HPPA was possible at pH values less than the $pK_a$ value, leading to the theory that the ionization of the carboxy functionality plays a significant role in the polymerizability of a given monomer. Polymerization of these monomers was possible even in the absence of buffer so long as the pH of the monomer solution was adjusted to about 3, and reasonably good polymer yield was obtained. It should be noted, however, that such low pH conditions are generally unsuitable for the optimal performance of HRP. According to the supplier, HRP used in this study has an optimal pH of 6, and the activity drops significantly as the pH is varied from 6. That the yields of poly(4-HPAA) and poly(4-HBA) were poor at low pH values is perhaps indicative of the necessity of further lowering pH values (note that their $pK_a$ values are lower, albeit slightly, than that of 4-HPPA) for efficient catalysis and the enzyme activity is affected at such low pH conditions. It can be concluded from these results that carboxy phenols in their ionized state (occurring significantly at pH>4) are not polymerizable under these conditions and that HRP is much more active up to and above a pH of about 3. This leads to a decrease in polymerization efficiency on the order of 4-HPPA to 4-HPAA to 4-HBA as the $pK_a$ of monomers decreases in the same order.

Sulfonic acids being stronger acids than carboxy acids, the operating pH required to keep sufficient number of the sulfonate groups protonated was too low for HRP to be catalytically active to a substantial degree. No polymerization was possible in solutions at pH>3 as the $pK_a$ for the monomer was much lower than 3. Indeed, as noted in Table I, under the conditions at hand, sulfonated phenol (4-HBSA) and aniline (SAA and 2,5-DABSA) were not polymerizable in the pH range of 1–7. However, in cases where the enzyme deactivation kinetics are slower than the reaction kinetics, some degree of polymerization is possible.

4-ethylphenol (4-EP) was copolymerized with 4-HPPA to demonstrate that the number density of functional groups in the copolymer can be controlled simply by adjusting the molar ratio between the monomers. FIG. 1 shows the FT-IR spectra of the copolymers at different 4-EP to 4-HPPA molar ratios. The intensity ratio for the peaks at 1710 cm$^{-1}$ (C=O stretch) to 2900 cm$^{-1}$ (C-H stretch) clearly increased as the molar fraction of 4-HPPA increased in the copolymer. Molecular weights ranging from 700 (pentamers) to 2500 could be obtained. Subsequent to the synthesis of the EP/4-HPPA copolymers, the carboxy groups were further derivatized to attach 4-amino TEMPO (a 2,2,6,6-tetramethyl-1-piperidine-N-oxyl spin label for electron paramagnetic resonance (EPR) spectroscopy) and the binding was ascertained by EPR spectroscopy. In a separate experiment, the copolymer of 4-EP and tyramine was prepared similar to 4-EP/4-HPPA copolymer, and derivatized with biotin for subsequent specific binding to the conjugates of the protein streptavidin. It is thus possible to enzymatically synthesize polyphenols with desired functional groups. Ionizable polymers of 4-HPPA and some of its copolymers with 4-EP are soluble in water under neutral and slightly alkaline conditions. Coupled with the conjugated nature of their backbones, such polymers find applications in detergency, batteries and biosensors.

Poly(4-bromophenol) or P4BP was synthesized for the fire retardant properties of the bromopolymer. The reaction was conducted in 100% aqueous media and in media containing 20% ethanol. There was a significant improvement in both the polymer yield (from 30% to 90%) and molecular weight (from 1500 to 2500) in the presence of ethanol, a fact noted earlier in the synthesis of polycresol (see Ayyagari et al., *Acta Polymerica*, 47:193–203 (1996)). Interestingly, the pH of the reaction medium dropped as the polymerization proceeded in 100% aqueous media. These changes are reported below in TABLE II.

TABLE II

| Reaction Medium | Buffer | pH Changes of Reaction Medium | Comments |
| --- | --- | --- | --- |
| (i) 100% buffer | 1 mM HEPES, pH 7.5 | pH dropped to 2.3 on polymerization | (i,ii,iii) Polymer yield and molecular weight, 30% and 1500, respectively, low compared to a reaction medium with 20% ethanol |
| (ii) 100% buffer | 10 mM HEPES, pH 7.5 | pH dropped to 6.8 on polymerization | |
| (iii) 100% buffer | 25 mM HEPES, pH 7.5 | pH dropped to 7.2 on polymerization | |
| (iv) 80% buffer 20% ethanol | 1 mM HEPES, pH 7.5 | pH dropped to 2.3 on polymerization | (iv,v,vi) Polymer yield and molecular weight >90% and 2500, respectively, are higher compared to 100% buffer reaction medium |
| (v) 80% buffer 20% ethanol | 10 mM HEPES, pH 7.5 | pH dropped to 6.8 on polymerization | (i,ii,iii,iv,v,vi) Elemental analysis of the polymer prepared indicated following composition (elemental analysis of the monomer is given in the bracket): carbon 47.7% (41.7%), hydrogen 2.8% (2.9%), oxygen 11.7% (9.2%), bromine 35.4% (46.2%). Calculated elemental composition of 12-mer polymer with 66% theoretical bromine: C - 49.7%, H - 2.5%, O - 11.0%, & Br - 36.7%. |
| (vi) 80% buffer 20% ethanol | 25 mM HEPES, pH 7.5 | pH dropped to 7.2 on polymerization | |

Elemental analysis of the product showed a 33% loss of bromine in the polymer. It remains to be studied whether this loss is a result of the elimination of bromine from the ring due to bond formation at para position and whether the loss of bromine contributes to the drop in pH.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of preparing a polyaromatic compound, said method comprising reacting together one or more aromatic monomers with a peroxide in the presence of a catalyst, said catalyst being selected from the group consisting essentially of heme-containing compounds, at least one of the one or more aromatic monomers having the following structure:

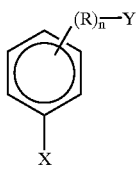

(I)

wherein X is OH, Y is selected from the group consisting of a boron-containing group, a phosphorus-containing group, a hydroxyacid group, a carboxyacid group, an amino acid group, an amide group, and a sulfonic acid group, R is an alkyl, phenyl, naphthyl, hydroxyphenyl, hydroxy naphthyl or hydroxy ($\alpha$, $\beta$, $\gamma$) alkyl group, and n is an integer from 0 to 12.

2. The method as claimed in claim 1 wherein said polyaromatic compound is a homopolymer.

3. The method as claimed in claim 1 wherein said polyaromatic compound is a copolymer.

4. The method as claimed in claim 3 wherein said copolymer is made by polymerizing an aromatic monomer of formula (I) and an aromatic monomer not of formula (I).

5. The method as claimed in claim 1 further comprising the step of derivatizing said polyaromatic compound by chemically modifying at least one of the Y moieties present in said polyaromatic compound.

6. The method as claimed in claim 1 wherein said catalyst is selected from the group consisting of heme and heme-containing compounds.

7. The method as claimed in claim 6 wherein said catalyst is selected from the group consisting of heme, hematin, cytohemin, hemoglobin, myoglobin, cytochrome c, cytochrome $c_1$, cytochrome $c_2$, cytochrome $c_3$, cytochrome $c_{551}$, cytochrome f and cytochromes P450.

8. The method as claimed in claim 1 wherein n is greater than 0.

9. The method as claimed in claim 1 wherein said reacting step is performed at a pH of about 3–4.

10. The method as claimed in claim 1 wherein said peroxide is hydrogen peroxide.

11. The method as claimed in claim 1 wherein said peroxide is added to said one or more aromatic monomers incrementally over a period of time.

12. The polyaromatic compound prepared by the method of claim 1.

13. The polyaromatic compound prepared by the method of claim 4.

14. The polyaromatic compound prepared by the method of claim 5.

15. A method of preparing a polyaromatic compound, said method comprising reacting together one or more aromatic monomers with a peroxide in the presence of a catalyst, said catalyst being selected from the group consisting essentially of heme-containing compounds, at least one of the one or more aromatic monomers having the following structure:

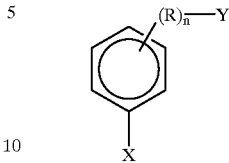

wherein X is $NH_2$, Y is selected from the group consisting of a boron-containing group, a phosphorus-containing group, a hydroxyacid group, a carboxyacid group, an amino acid group, and an amide group, R is an alkyl, phenyl, naphthyl, hydroxyphenyl, hydroxy naphthyl or hydroxy ($\alpha$, $\beta$, $\gamma$) alkyl group, and n is an integer from 0 to 12.

16. The polyaromatic compound prepared by the method of claim 15.

17. A method of preparing a polyaromatic compound, said method comprising reacting together one or more aromatic monomers with a peroxide in the presence of a heme-containing compound, at least one of the one or more aromatic monomers having the following structure:

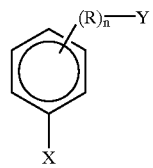

wherein X is selected from the group consisting of OH and $NH_2$, Y is selected from the group consisting of a halogen, a halogen-containing group, a boron-containing group, a phosphorus-containing group, a carboxyl group, a hydroxyacid group, a carboxyacid group, an amino group, an amino acid group, an amide group, an ester group, a hydroxyl group and a sulfonic acid group, R is an alkyl, phenyl, naphthyl, hydroxyphenyl, hydroxy naphthyl or hydroxy ($\alpha$, $\beta$, $\gamma$) alkyl group, and n is an integer from 0 to 12.

18. The method as claimed in claim 17 wherein n is greater than 0.

19. The method as claimed in claim 17 wherein said reacting step is performed at a pH of about 3–4.

20. The method as claimed in claim 17 further comprising the step of derivatizing said polyaromatic compound by chemically modifying at least one of the Y moieties present in said polyaromatic compound.

* * * * *

UNITED STATES PATENT AND TRADEMARK OFFICE
Certificate

Patent No. 6,150,491 B1

Patented: July 23, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Joseph A. Akkara, Holliston, MA; and Madhu Ayyagari, Rochester, NY.

Signed and Sealed this Twenty-fourth Day of December 2002.

JAMES SEIDLECK
*Supervisory Patent Examiner*
Art Unit 1711